United States Patent [19]
Lentz et al.

[11] Patent Number: 5,706,047
[45] Date of Patent: Jan. 6, 1998

[54] STORAGE MEDIA FOR AN OPTICAL INFORMATION SYSTEM HAVING AN IDENTIFICATION CODE EMBEDDED THEREIN

[75] Inventors: Joseph Lentz, Kendall; Thomas Richard Cushman; Patrick Joseph Kline, both of Rochester, all of N.Y.

[73] Assignee: Eastman Kodak Company, Rochester, N.Y.

[21] Appl. No.: 427,520

[22] Filed: Apr. 24, 1995

Related U.S. Application Data

[63] Continuation of Ser. No. 203,842, Feb. 28, 1994, Pat. No. 5,430,281, which is a continuation of Ser. No. 810,976, Dec. 20, 1991, abandoned.

[51] Int. Cl.[6] .......................... B41J 2/435; G01D 15/24; H01S 1/131; G11B 7/00
[52] U.S. Cl. .................. 347/262; 346/135.1; 235/462; 235/436
[58] Field of Search .......................... 235/454, 487, 235/375, 380, 462, 463, 464, 436, 494; 364/952.1; 347/262, 264; 346/135.1

[56] References Cited

U.S. PATENT DOCUMENTS

| | | | |
|---|---|---|---|
| 3,752,961 | 8/1973 | Torrey | 382/313 |
| 4,141,078 | 2/1979 | Bridges, Jr. et al. | 235/375 |
| 4,961,077 | 10/1990 | Wilson et al. | 347/262 |

Primary Examiner—Benjamin R. Fuller
Assistant Examiner—Raquel Yvette Gordon
Attorney, Agent, or Firm—Raymond L. Owens

[57] ABSTRACT

A optical storage disc for use in an optical storage system includes a storage layer which is capable of being disrupted when a laser beam of sufficient intensity is focused thereon. The optical storage disc has a transparent substrate layer on one side of the storage layer and a lacquer layer on the other side of the storage layer. The disruptions provided by the laser beam are selected to provide human readable and/or machine readable patterns. To reduce the damage to portions of the optical disc other than the storage layer, the storage layer is exposed to the laser beam prior to curing, or prior to applying and curing the lacquer layer. The optical disc can be of the type with data written thereon during fabrication, or the disc can be of the type in which data can be impressed thereon after fabrication of the optical disc. The patterns on the optical disc can be in the form of optical bar codes formed in a mirror region of the disc. In one application of the present invention involving the type of disc on which data can be written after fabrication, the pattern resulting from application of the laser beam to the disc is read by an optical reading device and transferred to the disc in the data format.

6 Claims, 6 Drawing Sheets

STORAGE MEDIA FOR AN OPTICAL INFORMATION SYSTEM HAVING AN IDENTIFICATION CODE EMBEDDED THEREIN

CROSS-REFERENCE TO RELATED APPLICATIONS

This application is a continuation application of, and claims the benefit of priority under 35 U.S.C. § 120 from, U.S. patent application Ser. No. 08/203,842, filed Feb. 28, 1994, U.S. Pat. No. 5,430,281 the contents of which are incorporated herein, which is a continuing application of U.S. patent application Ser. No. 07/810,976 filed on Dec. 20, 1991 abandoned. Reference is also made to commonly assigned U.S. patent application Ser. No. 07,999,626 filed Dec. 31, 1992, which is a continuation-in-part of U.S. patent application Ser. No. 07/810,976 filed on Dec. 20, 1991.

BACKGROUND OF THE INVENTION

1. Field of Invention

The invention relates generally to media upon which information is stored in an optical information storage and retrieval unit and, more particularly, to the inclusion in the media of an indelible identifying code.

2. Description of the Related Art

At the present state of technology, the optical storage disc is the preferred medium for read-only storage of large quantities of information. In this medium, the information is retrieved through the interaction of a radiation beam with the storage medium. At present, three principal types of optical storage discs are in common use. The first type of optical storage disc is manufactured with the information stored therein, generally in the form depressions formed into a polycarbonate substrate. A reflecting coating is deposited on the polycarbonate substrate and the radiation beam is focused on the reflecting layer. This type of optical disc is frequently referred to as a CD audio disc or a ROM (i.e., read only memory) disc. The second type of optical storage disc has the capability of having information recorded (written) thereon at some time after the fabrication of the disc. Such an optical storage disc is frequently referred to as a writable optical storage disc. The third type of optical storage disc has the capacity to have information recorded on the disc after fabrication. In addition, the stored information can be erased or modified at a later time. This type of optical storage disc is generally referred to as an erasable or a re-writable optical storage disc.

In each type of optical storage disc, the storage layer is supported and protected by a polycarbonate support substrate and by a protective (lacquer) overcoat layer. However, the storage layer is modified in the writable disc and in the erasable disc. The storage layer in the writable disc includes a reflector layer (generally fabricated from gold) proximate the lacquer overcoat layer and includes a recording layer, typically a dye polymer layer, proximate the polycarbonate layer. The newly fabricated writable optical storage disc has a recording layer that is responsive to radiation having selected parameters, the radiation changing the optical properties of the recording layer. Differences in the optical properties of the recording layer can be detected, through the interaction with an impinging radiation beam and information, encoded by means of the optical property changes, can be recovered. In order to simplify the discussion, the recording, storage, and/or the reflective layer of the writable optical disc will be referred to as the storage layer.

During and after the manufacturing process, a need has been felt for a technique for providing permanent identification for the disc. In this manner, any problems that might originate with the manufacturing process can be related to discs fabricated during the same period of time or even to the same batch. Similarly, the history of the usage of the disc can be determined when a record is kept of the identifying information at the time of the accessing of the disc.

In the prior art, information has been applied to the surface of the disc, by means of mechanical disruption of the surface or by deposition of legible material on the surface. The information provided on the surface of the disc, however, can be easily compromised either accidentally or intentionally.

Recently, in U.S. Pat. No. 4,961,077 issued to D. L. Wilson et al., a technique for the permanent labelling of the discs was described. Specifically, the metal reflective layer, upon which the permanent identification information is stored as areas of varying reflectivity, is marked by means of a pulsed laser. The pulsed laser causes an indelible marking on the reflective layer, a marking which is protected by the same transparent coating which protects the reflective coating. The process described in the Wilson reference is extremely sensitive to the energy level of the laser beam, too small an energy level in the laser beam not providing an identifiable marking, while too much energy can disrupt the lacquer overcoat layer and/or the polycarbonate layer used to protect the reflective layer. The disruption of the storage layer can result in damage to the surrounding portions of the optical disc. In addition, applying the laser beam to the reflective surface through the narrower of the two protective coatings is recommended to minimize the destructive effects of the laser beam resulting from the passage of high intensity radiation through the layers.

A need has been felt for a technique for providing indelible identifying markings for the discs storing optical information which is relatively insensitive to the power of the radiation beam and which reduces the damage to the optical disc. Also needed is a technique for enhancing the machine readability of the disc markings.

SUMMARY OF THE INVENTION

The present invention is directed to overcoming one or more of the problems set forth above. Briefly summarized, according to one aspect of the present invention, the marking of the disc is performed on the storage layer of the optical disc, however, the marking is performed prior to the curing of the protective lacquer overcoat or prior to the application of the protective overcoat itself. Because the lacquer overcoat, prior to curing of this material, is relatively elastic, the disruption of the overcoat as a result of the laser interaction with the reflective layer can be accomplished without excessive damage. The markings provided by the laser beam are arranged in preselected patterns, the patterns including machine readable and human readable information. According to one embodiment, optical bar code patterns can be printed in a manner that the position of an optical bar code reader relative to the center of the disc is irrelevant in interpreting the optical bar code message. The optical bar code patterns are located in the mirror region of the disc.

These and other aspects, objects, features and advantages of the present invention will be more clearly understood and appreciated from a review of the following detailed description of the preferred embodiments and appended claims, and be reference to the accompanying drawings.

BRIEF DESCRIPTION OF THE DRAWINGS

FIG. 4a is a cross sectional view of a mark in an optical storage disc generated as a result of the process illustrated in FIG. 3A, while

DESCRIPTION OF THE PREFERRED EMBODIMENTS

Figure 1:
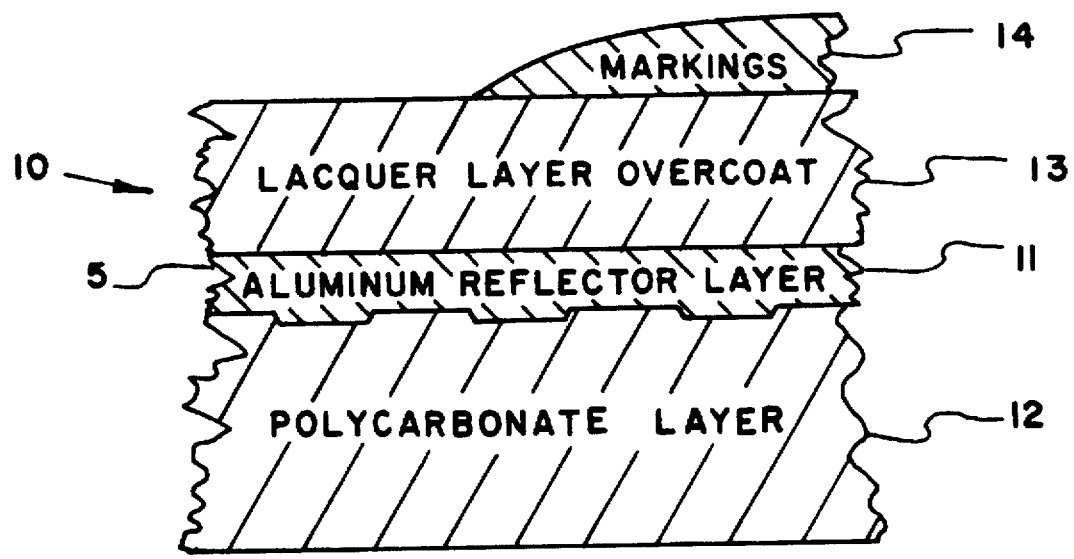
FIG. 1 is a cross sectional view of an optical storage disc of the type generally referred to as a read-only optical storage disc.

Referring to FIG. 1, a cross-sectional view of a read-only optical storage disc 10 for storing prerecorded data (in a form which can be identified by a radiation beam interacting with the disc) is shown. Transparent polycarbonate or substrate layer 12, or similar material has an optical transmission characteristic which permits the radiation interacting with the storage layer structure of the optical disc to be transmitted therethrough. The polycarbonate layer also acts as a support and protection layer for the remainder of the optical disc. Next to the polycarbonate layer 12 is the aluminum reflector layer 11. The polycarbonate layer 12 is fabricated with the stored information as a surface structure. The reflecting layer is deposited in such a manner as to provide a surface generally retaining the structure of the polycarbonate surface. A lacquer or other protective overcoat layer 13 is applied to the aluminum reflector layer in an uncured state. The lacquer or protective layer is typically of the type which is cured by ultraviolet radiation and the cured lacquer layer 13 supports and protects the aluminum reflector layer 11. In the past, identification markings 14 have been typically printed on the surface of the lacquer overcoat layer 13 or mechanically scribed in the surface of lacquer overcoat layer 13.

Figure 2:
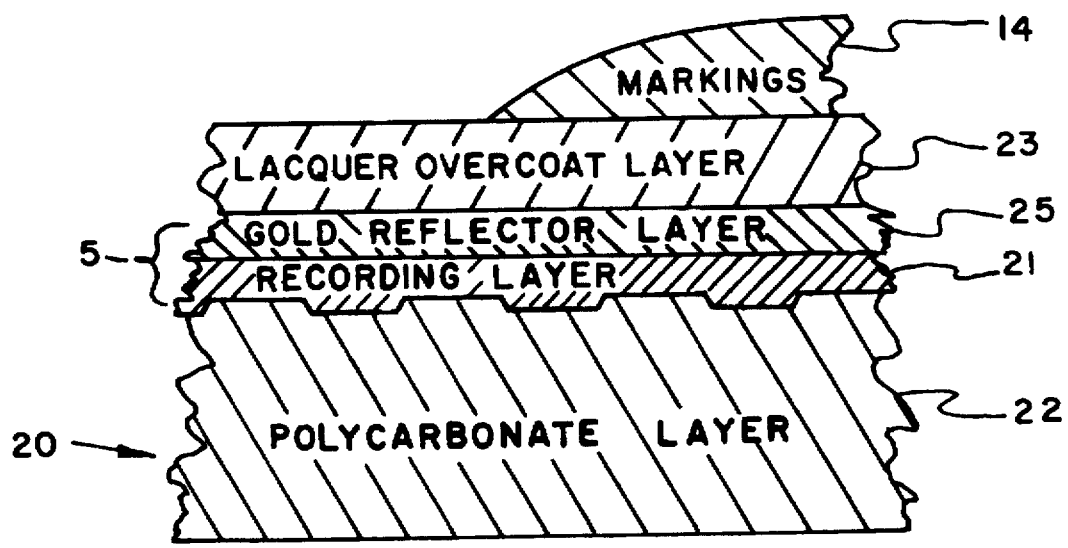
FIG. 2 is a cross sectional view of an optical disc of the type generally referred to as a writable optical storage disc.

Referring to FIG. 2, a writable optical storage disc 20 used for the storage of information is shown. In this type of optical storage disc, the data can be 'written' on the disc after the disc is fabricated. As with the optical storage disc of FIG. 1, the writable optical disc includes a polycarbonate substrate of support layer 22. The storage layer 5 of the disc consists of a recording layer 21, which can be a dye polymer layer, and reflector layer 25, which can be fabricated from gold. Next to the reflector layer 25 is a lacquer overcoat layer 23, which is applied and then cured. Finally, the markings 24 on the surface of the disc provide human and machine readable information.

Figures 3A, 3B:
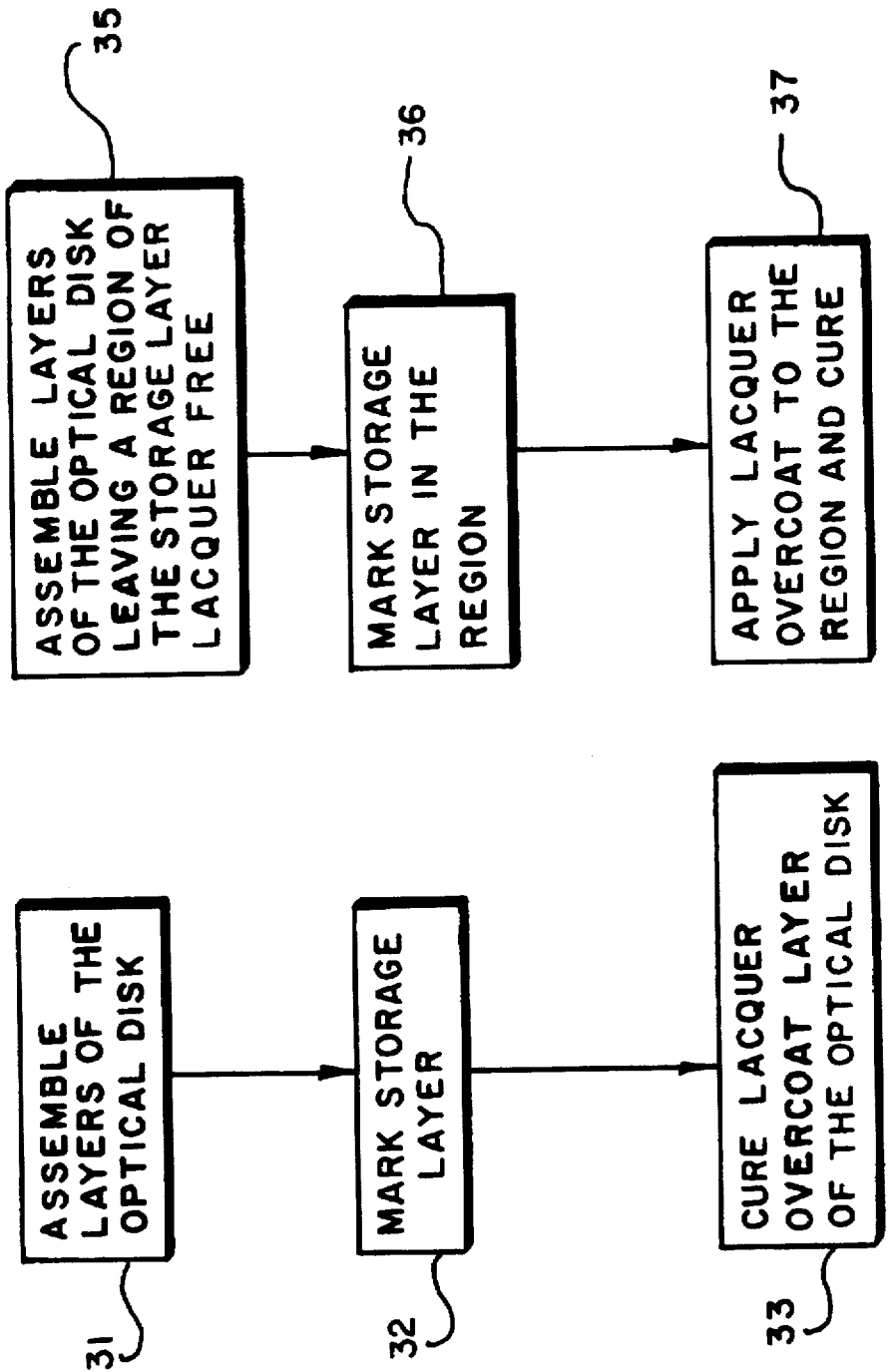
FIG. 3A illustrates a first embodiment of a process by which machine readable and human readable information can be indelibly fixed in the optical storage media.
FIG. 3B illustrates a second embodiment of a process by which machine readable and human readable information can be indelibly fixed in an optical storage media.

Referring to FIG. 3A, the process for providing indelible information on a disc is shown. In step 1, the several layers of the optical disc is assembled. In step 32, the storage layer and the reflecting layer of the optical disc has information applied thereto, typically by using laser radiation to disrupt an interior surface region. In step 33, the lacquer overcoat layer is cured, providing the final step in the fabrication of an optical disc according to the present invention. In FIG. 3B, an alternative process for providing indelible information on an optical disc is shown. In step 35, several layers of the optical disc are assembled. However, the surface region of the storage layer and reflective layer, on which the writing is to be inscribed, does not have the lacquer or protective coating applied thereon. In step 36, the marking of the surface is accomplished. In the preferred embodiment, this marking is accomplished by focused high intensity radiation, such as focused laser radiation. In step 37, the newly applied protective overcoat is applied to the region which has been marked and, if required, the protective coating is cured.

Figure 4A:
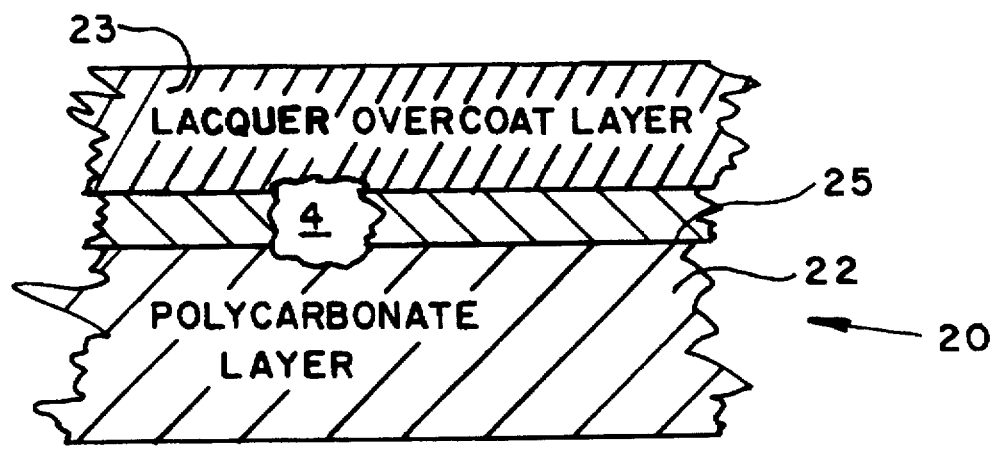
Figure 4B:
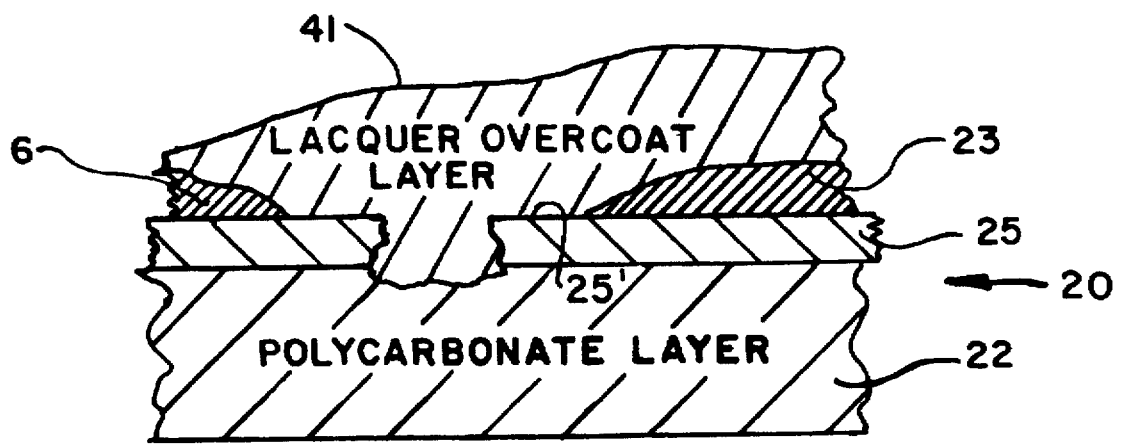
FIG. 4B is a cross sectional view of a mark in an optical storage disc generated as a result of the process illustrated in FIG. 4B.

Referring to FIG. 4A, a phenomenalogical representation of an identifying mark on an optical disc, capable of having information written thereon after fabrication, is shown. The disc 20 is fabricated with a polycarbonate layer 22, a reflecting layer 25, and a lacquer overcoat layer 23. The disruption 4 caused by the laser radiation is in the reflector layer 25, depending on the intensity of the radiation can extend to or into the polycarbonate layer. In FIG. 4B, the disc 20 is assembled with the polycarbonate layer 22, the reflecting layer 25, and the lacquer or protective overcoat layer 23. However, a region 25' is not covered by the lacquer overcoat. The radiation causes a disruption in a selected region of the reflecting layer 5. The radiation parameters can be adjusted to provide relatively little impact on the polycarbonate substrate. The region without the lacquer overcoat can have also have printing applied thereto. The additional lacquer overcoat is applied, protecting the disrupted and/or printed region and protecting the information represented thereby from compromise.

Figure 5:
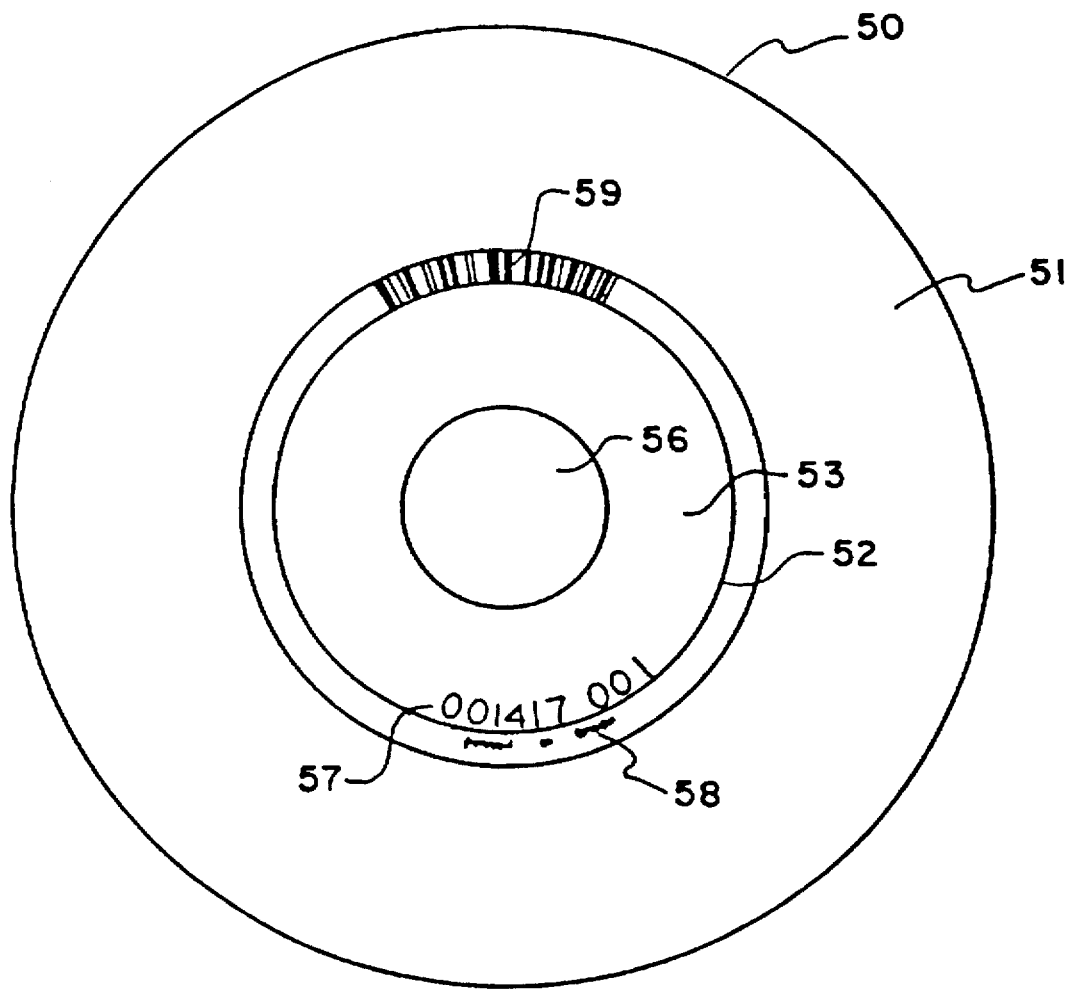
FIG. 5 illustrates an optical disc having machine readable and human readable text printed thereon.

Referring to FIG. 5, a top view of a optical storage disc, particularly a type of disc 50 known as a compact disc (CD) is shown. The optical disc 50 typically has four regions which, with increasing radius can be defined as the following. Aperture 56 provides a structure to engage a spindle for controlled rotation of the disc. The next area is a clamp area or zone 53. The clamp area 53 typically does not have a storage layer associated therewith and is used to provide a space wherein the spindle can be mechanically coupled to the disc without interfering with access to the data stored on the disc. The mirror area 52 has a storage layer associated therewith but does not have data embedded therein and, therefore, has a mirror-like appearance. Data area 51 of disc 50 has data stored on the storage layer including the reflecting layer associated therewith and, consequently, because of the structure in the reflecting layer, has a dull appearance when compared to the mirror-like appearance of mirror area 52. The mirror area 52 can be labelled in either a machine readable code 55 and/or with human readable markings by the process described in FIG. 3A and FIG. 3B, and illustrated by FIG. 4A and FIG. 4B. The disc 50 can therefore be labelled or marked by carbonizing the plastic in clamp area 53, marking the mirror area 52 of an optical disc 50 in the presence of an uncured lacquer overcoat layer 23 and then curing the lacquer overcoat layer as described above, marking the mirror area 52 of the disc prior to application of the protective overcoat 41 and curing of the lacquer overcoat region 41 after application of the protective coating, or marking the mirror region 52 after the protective layer 23 is cured. In the preferred embodiment, a group of alpha/numeric characters 58 are printed in the clamp area and identifying fabrication information. Alpha/numeric characters are provided in a human readable format and are printed on the surface of the mirror region 52. Code characters 59 are provided in the mirror region 52 in a machine readable (i.e., bar code) format.

Industry accepted standards for locating the aperture 56, clamp area 53, mirror region 52 and data area 51 have been adopted. The physical standards for both CD-Audio and CD-ROM discs are described in the "Compact Disc Digital Audio System Description" developed by Sony Corporation and N. V. Phillips and commonly referred to as the "Red Book". The Red Book specifies that the clamp area or zone 53 extends from a radius of 13.0 mm to a radius of 16.5 mm. The clamp area 53 must meet certain requirements for thickness, flatness, and absolute position relative to the information carrying surface of the disc in order to assure proper interface of the disc to a CD reader. As would be readily appreciated by one of ordinary skill in the art, the data area 51 includes a lead-in area located between a radius of 23.0 (+0.0, –0.1) mm and 25.0 (+0.0, –0.2) mm and a program area that follows the lead-in area and extends toward an outer radius of the disc (60.0) mm for a distance that depends on the amount of information stored on the disc. Compact disc readers must be able to access the lead-in area and track on and recover information encoded in the disc in the form and format identical to information encoded in the program area. A further information area is defined for recordable compact discs in the document "Compact Discs, Recordable Compact Disc Systems, Systems Descriptions" by Sony Corporation and N. V. Phillips, commonly referred to as the "Orange Book". The information area is defined as beginning at a radius of 23.35 (+0.15, –0.00) mm. The region between the start of the information area and the start of the leadin area is used for recordings that must be performed as part of the writing process. Examples include performing write power calibration, storing a temporary table of contents, etc. Compact disc writers need to access this area, so it must be identical in physical form to the lead-in and program areas discussed above. Many discs also include an area between radii of 16.5 and 18.0 mm that contains various features such as a raised annular ring or moat that is used to provide easy separation of the discs. The mirror region 52, as would be readily understood by those skilled in the art, lies between the end of the moat area and the beginning of the lead-in area, namely between about 18.0 to 23.0 mm, for CD-Audio and CD-ROM discs, and between the end of the moat area and the beginning of the information area, namely between about 18.0 to 22.4 mm, for a recordable CD. If a moat is not provided on the disc, the mirror region 52 may begin at the end of the clamp zone.

Figure 6:
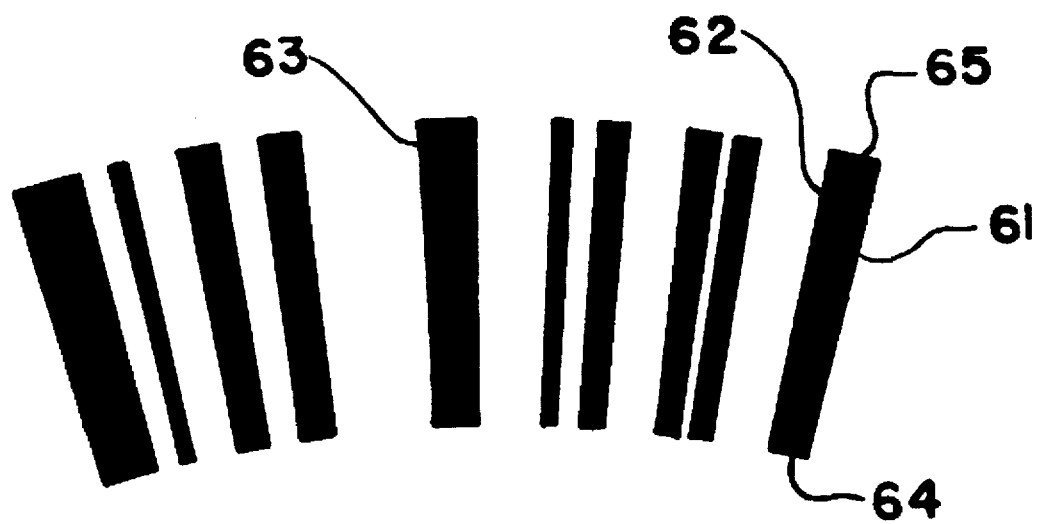
FIG. 6 illustrates how the optical bar code characters are formed according to the present invention.

Referring to FIG. 6, an expanded view of the technique for writing information capable of being interpreted by an optical bar code reader in a manner in which the distance of the reader from the center of the disc is not important, even though the linear velocity of the optical code past the reader is a function of radius. The optical bar code markings 61 are formed by marking the area between two radius lines 61 and 62 from a first radial distance ($R_1$) 64 to a second radial distance ($R_2$) 65. With this bar code configuration, for a constant angular velocity of the disc, the distance of a bar code reader from the center of the disc is irrelevant. The time each bar interacts optically with the detector of the optical bar code reader retrieving information from the storage is independent of the distance from the disc center.

Figure 7:
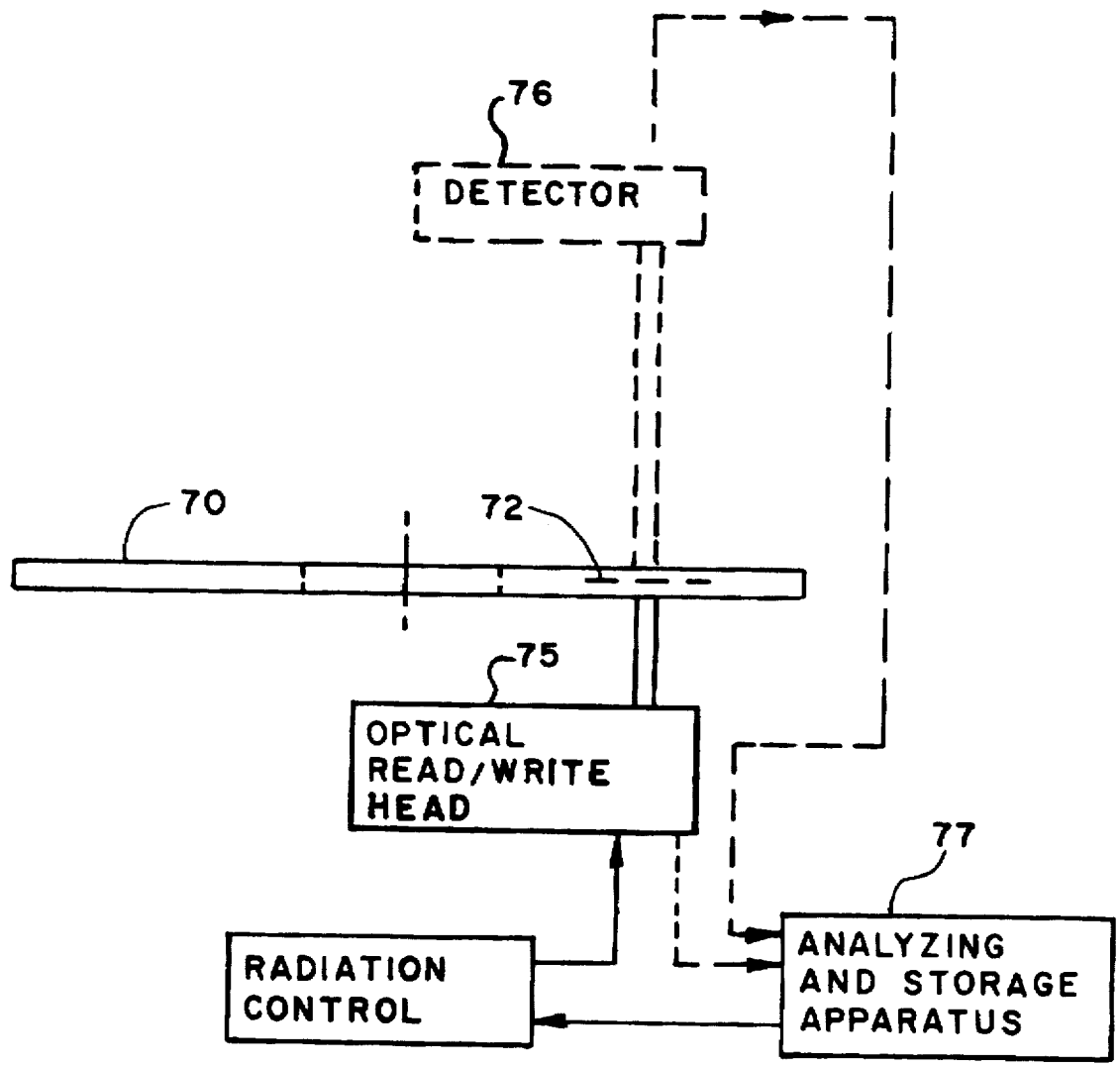
FIG. 7 is a block diagram of the storage medium and the read/write head including apparatus associated therewith of the storage and retrieval unit.

Referring to FIG. 7, apparatus for reading the machine readable markings on an optical disc 70 is shown. A read/write head 75 applies radiation suitable for reading information to the markings to the disc. The reflected radiation has an intensity modulated by the identification markings 72. The optical read/write head 75 can identify the intensity of the reflected signal, or, the detector 76 can identify transmitted radiation. The resulting signals from either read/write head 75 or from detector 76 are applied to the analyzing and storage apparatus 77 where the data is processed and, when required stored. When the optical disc 70 is a disc upon which information can be written, the analyzing and storage apparatus 77 can be used to control the information written on the disc. In this manner, the information identifying the optical disc can be encoded and written on the data portion of the disc in a format compatible with the other data written thereon.

Briefly summarized, according to one aspect of the present invention, the marking of the disc is performed on the storage layer of an optical storage disc, however, the marking is performed prior to the curing of the lacquer overcoat layer according to one embodiment and prior to the application of the lacquer coating in a second embodiment. In the optical storage disc of the present invention, the overcoat is fabricated from a lacquer material for which ultraviolet light provides the curing reaction and reduces the elasticity of the overcoat.

The purpose of the invention is to provide a technique for the application of an indelible identifying marks to an optical disc. Briefly summarized, according to one aspect of the present invention, the marking of the disc is performed on the storage layer, however, the marking is performed prior to the curing of, or prior to the application of the lacquer or protective overcoat layer. Where not previously applied, the protective overcoat is then applied. The lacquer material is then exposed to ultraviolet light which provides the curing for the lacquer overcoat layer. By marking storage layer prior to curing of the lacquer overcoat layer, the lacquer overcoat layer, when present remains pliable enough to absorb damage that would otherwise result from the disruption of the polycarbonate layer.

In the optical disc capable of having information written or stored thereon after fabrication, the present invention has an important application. A facility capable of only reading the optical disc would typically not have the apparatus to interpret the optical bar code. Without the ability of read and interpret the bar code automatically, information can be stored on the disc which is not appropriate for that disc. Therefore, at the facility where the data is added to the fabricated disc, an optical bar code reader can be used to identify the optical bar code information and to include the information automatically in the data written or stored on the disc. In other words, the simultaneous presence of bar coded encoded information and equivalent information stored in the format of the information written on the optical disc insures that the disc has not been compromised.

While the storage medium has been described both in general terms and in terms of an optical disc, other medium for the storage of optical information, which have the general layer structure of the optical disc, can use the present invention advantageously. In addition, the storage layer has been described as generally including a reflective layer. The use of the reflection of radiation from a storage disc is generally used to identify the information stored thereon. However, the use of an optical storage disc which relies on the interaction of transmitted radiation with the storage media could use the present invention advantageously.

Similarly, while the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention. By way of specific example, the lacquer layer used proximate the storage layer could be implemented with any material having properties suitable for the protection of the storage layer. By way of a different example, in the erasable optical disc, the storage layer can be selected of a material wherein an impinging radiation beam this appropriate parameters can provide a non-reversible change can take place. The non-reversible change protected from compromise by the protective overcoat layer.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

PARTS LIST 4 disruption
5 storage layer
10 disc
11 reflector layer
12 polycarbonate or substrate layer
13 overcoat layer
14 identification markings
20 disc
21 recording layer
22 support layer
23 overcoat layer
24 markings
25 reflector layer
25' region
41 protective overcoat
50 disc
51 data area
52 mirror area
53 clamp area
55 readable code
56 aperture
59 code characters
61 code markings
62 radius lines
64 radial distance
65 second radial distance
70 disc
72 identification markings
75 read/write head
76 detector
77 storage apparatus

What is claimed is:

1. An optical storage disc including a clamp area, a data area and a mirror area, said optical storage disc comprising:
   a support substrate layer;
   a storage layer proximate said support substrate layer, wherein said storage layer includes a preselected pattern of disruptions formed by a laser beam in the mirror area of the optical storage disc, wherein the preselected pattern of disruptions comprise a bar code including a plurality of bar code characters, and wherein a thickness of each bar code character is a linear function of distance from a center of said optical disc; and
   a protective layer covering said storage layer.

2. The optical storage disc of claim 1 wherein said pattern of disruptions is structured such that the bar code pattern can be read by an optical bar code reader independent of radial position.

3. The optical storage disc of claim 1 wherein said storage layer includes a dye polymer layer.

4. The optical storage disc of claim 1 wherein said pattern of disruptions comprising the bar code pattern includes information related to the fabrication of said disc.

5. A method of permanently marking an optical storage disc including a clamp area, a data area and a mirror area, said method comprising the steps of:
   assembling an optical disc having a storage layer and a polycarbonate layer;
   applying a pattern of disruptions on a selected region of said storage layer comprising the mirror area of the optical disc with a laser beam, said pattern of disruptions comprises an optical bar code including a plurality of bar code characters, wherein a thickness of each bar code character is a linear function of distance from a center of said optical disc; and
   protecting said selected region of said storage layer with a lacquer layer; and selecting said pattern of disruptions to provide an optical bar code.

6. The method of claim 5 wherein said protecting step includes a step of covering said selected region with a protective overcoat following said applying step.

* * * * *